UNITED STATES PATENT OFFICE.

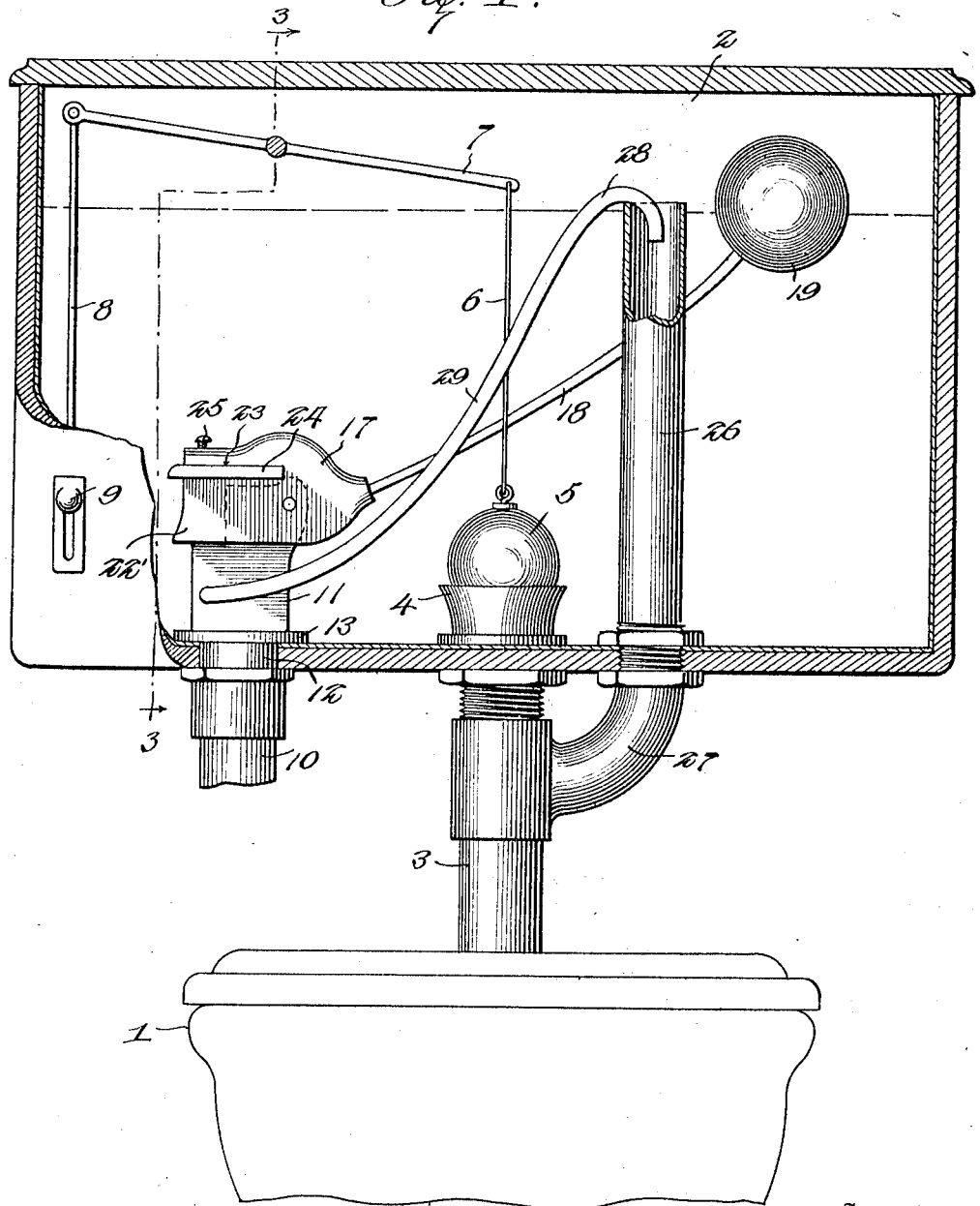

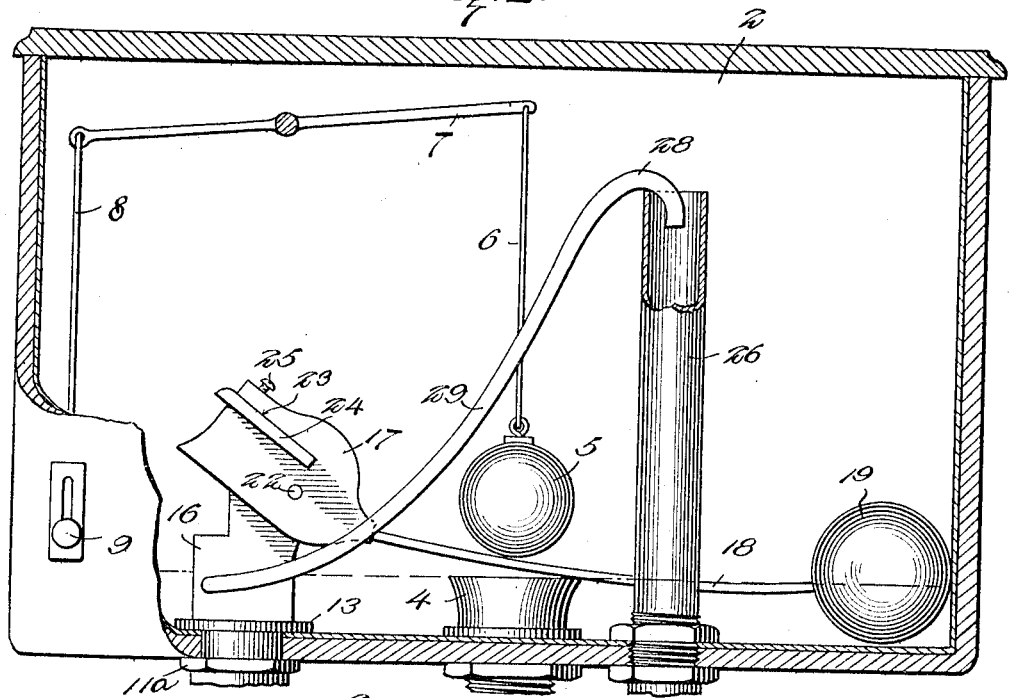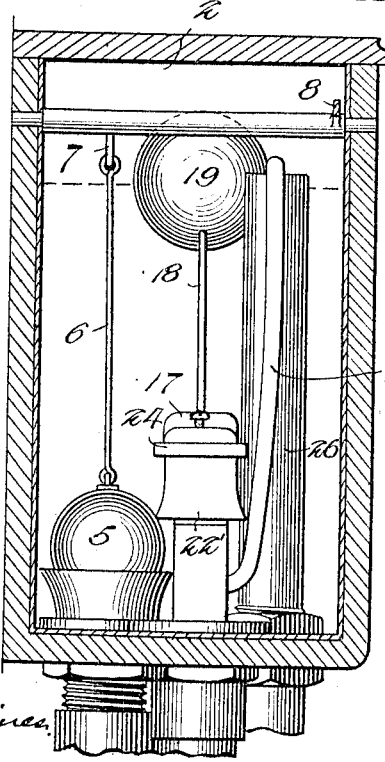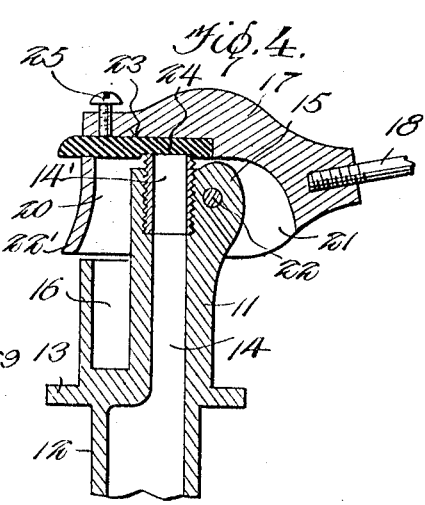

WILLIAM A. DAY, OF BELLINGHAM, WASHINGTON, ASSIGNOR OF ONE-HALF TO WALTER M. WILMER, OF BELLINGHAM, WASHINGTON.

FLOAT-VALVE.

1,055,143.  Specification of Letters Patent.  Patented Mar. 4, 1913.

Application filed January 10, 1911. Serial No. 601,830.

*To all whom it may concern:*

Be it known that I, WILLIAM A. DAY, a citizen of the United States, residing at Bellingham, in the county of Whatcom and State of Washington, have invented new and useful Improvements in Float-Valves, of which the following is a specification.

This invention relates to closet cisterns and float valves for controlling the inlet of water to flush tanks of toilet systems, the primary object of the invention being to provide a float valve which is simple of construction, positive and certain in action, adapted to prevent any objectionable spurting of the entering water, and having a gasket and seat relatively and independently adjustable to take up wear and whereby leakage may be at all times readily prevented.
A further object of the invention is to provide a valve in which the gasket and seat are readily removable for renewal as occasion requires, thus enabling repairs to be made at small expense, and in which the gasket is reversible so that when the portion in use as the seat closure is worn a new portion may be presented for service.

A still further object of the invention is to provide a means for use in conjunction with the valve for partially refilling the bowl after each flush with a desired quantity of water.

The invention consists of the features of construction, combination and arrangement of parts, hereinafter fully described and claimed, reference being had to the accompanying drawings, in which:—

Figure 1 is a sectional elevation, showing a bowl and flush tank, the tank being filled to the normal level and the valve closed. Fig. 2 is a sectional view of the tank similar to Fig. 1, showing the water discharged to the lowest level and the valve opened for the inlet of water. Fig. 3 is a section on the line 3—3 of Fig. 1. Fig. 4 is a vertical longitudinal section through the valve device.

Referring to the drawings, 1 designates a bowl and 2 a flush tank, in communication through a flush pipe 3, passing through and suitably secured at its upper end to the bottom of the tank. Carried by the upper end of said pipe within the tank is a valve seat 4 adapted to be closed by a flush valve 5. The valve is connected by a link 6 with one end of a pivoted lever 7, the opposite end of which is suitably connected by a rod 8 with a push button or its equivalent 9, whereby the lever may be tilted to operate the valve. The invention is particularly designed for use in connection with flushing apparatus of this character, although it is not limited to any particular type of valve-operating means.

Terminating in proximity to the bottom of the tank is the delivery end of a water supply pipe 10 which is suitably coupled to the lower end of an inlet connection or casting 11, the lower end 12 of which is circular in form and projects downward through an opening in the tank bottom and is provided with a flange 13 to rest against the upper face of said bottom. The lower end of this connection or casting is clamped to the bottom of the tank by a nut or coupling member 11ª, which also secures it to the proximate end of the water supply pipe 10.

The casting 11 is formed with a vertical water supply passage 14 enlarged and internally threaded at its upper end to receive an externally threaded valve seat tube 14′, the bore or passage of which communicates with the passage 14 and is of angular form throughout or only at its upper end for the reception of a suitable turning key, whereby said valve seat tube may be adjusted. At one side of the upper end of the casting is a perforated ear 15 and at its opposite side said casting is formed with a cup or well 16, open at its upper end which terminates below the upper end of the casting.

Pivotally mounted upon the ear 15 of the casting is a valve member or body 17 from the outer or rear end of which extends a rod or arm 18 carrying a float 19, which rises and falls with the change of level of water in the tank to move the valve member so as to close or open the valve. The arm 18 is preferably made of malleable metal so that it may be bent to vary the position of the float to effect the closing of the valve at different water levels. The said valve member 17 is recessed, as at 20, to receive the portion of the casting above the line of the well 16 when said valve member is in closed position, the recessing of the valve providing a pair of side portions 21 receiving the pivot pin 22 passing through the ear 15, whereby the valve member is pivotally mounted. The forward ends of the side portions 21 are connected by an end wall 22′ which is outwardly flared at its lower end to overhang the well 16 and deflect a portion of the entering water thereinto as well as to prevent objectionable spurting of the water from the tube 14 into the tank during the outset of the opening movement of the valve. The valve member is also provided with a horizontal transverse slot 23 in which is slidably fitted a gasket 24, composed of rubber, soft metal or other suitable material, which gasket is secured in position by a clamping screw 25 under the pressure of which it is adapted, by its flexibility or capacity to bend, to be deflected to a slight degree downward to effect a tight sealing connection with the upper end of the seat 14' when the valve is in closed position.

When the water in the tank is up to its highest level, as indicated by the dotted lines in Figs. 1 and 3, the valve member is held seated to close the passage 14 against the increase of water to the tank, and in this position of the valve the gasket bears tightly against the upper end of the tube 14' to prevent any possibility of leakage of water therethrough. When the portion of the gasket which seats against the tube 14' becomes unduly worn, the gasket may be withdrawn and reversed end-for-end or side-for-side and replaced to present a new and unworn portion to bear against the tube 14'. Through this capacity of adjustment of the gasket to present new surfaces for use, as well as its capability of being easily removed and replaced by a new gasket, any repairs in the valve proper to adapt it to tightly seat against the tube 14' may be readily and conveniently made at the sacrifice of a comparatively small amount of time and labor. The tube 14' is also adjustable for the same purpose, and may be removed when unduly worn for the substitution of a new tube in its place, the advantages and conveniences of which will be apparent.

A refilling pipe 26 extends upwardly into the tank to a point above the high water level and is suitably secured at its lower end to the tank and coupled by a connection 27 to the flush pipe 3. Into the upper end of this pipe projects the goose-necked upper end 28 of a conducting tube 29 communicating at its opposite or lower end with the lower end of the well or cup 16 through one side thereof. As the well or cup is in constant communication with the interior of the tank, it will be apparent that said cup will be filled when the tank is filled to its highest water level and that the tube 29 will also be filled up to a point adjacent the goose-neck 28. When the valve 5 is opened for the discharge of water, and the water lowers in the tank 2, the float 19 descends therewith and gradually effects an opening movement of the valve 17, the construction and arrangement being such, however, that the gasket 24 owing to its resiliency, will maintain a sealing engagement with the seat 14' until the float descends a short distance, at which time a gradual movement of the gasket away from the seat will occur, so that the valve member will be fully opened for the ingress of water when the float reaches its lowest position, as indicated by the dotted lines in Fig. 2. The column of water flowing through the passage 14 and tube 14', will enter the recessed portion of the valve and strike against the gasket, whereby it will be deflected downward into the tank and prevented from spurting to an objectionable degree. At the same time a portion of the entering water will be deflected immediately downward into the cup 16 by the deflector wall 22', filling the cup before the water in the tank reaches the level of the top of the cup. The cup will thus be washed free of any sediment which may have been deposited therein and kept in filled condition, to effect a partial refilling of the bowl after the flushing action. The discharge of the water through the pipe 3 into the bowl causes the formation of a partial vacuum in the pipe 26 through the induced suction, as a result of which a siphonic action will be established through the pipe 29 for the passage of the water from the cup into the pipe 26 and thence to the bowl, whereby the latter will be partially refilled after the flushing action. Upon the release of the operating device the valve 5 will close the seat 4 against the discharge of water and as the water entering through the pipe 10 and passage 14 rises into the tank the float will be gradually elevated and gradually swing the valve member 17 to closed position, the valve being entirely closed when the water reaches its maximum level in the tank to cut off the further flow of water thereto.

From the foregoing description, taken in connection with the drawings, the construction and mode of operation of my improved flushing and refilling apparatus will be readily understood, and it will be seen that simple and efficient means for the purpose set forth are provided, and that through the described construction and mode of mounting the valve seat tube 14' and gasket 24 these parts may be adjusted for wear and readily replaced when worn to such an extent as to be of no further service.

Having thus described the invention, I claim:—

A float valve mechanism for flush tanks comprising a casting having a vertically disposed water feed passage, a valve seat tube adjustably mounted in the upper end of said passage, a valve member comprising an oblong body having depending side and front portions normally inclosing the top of the casting, said side portions being pivoted to the casting, and the said body being provided with a horizontal transverse slot opening through said side portions and front portion, a gasket slidably fitted in said slot and adapted to engage the valve seat tube, and means for securing said gasket in position.

In testimony whereof I affix my signature in presence of two witnesses.

WILLIAM A. DAY.

Witnesses:
EDMUND G. JEWETT,
R. S. SIMPSON.